Dec. 30, 1924.
A. CAMPBELL
1,520,695
OPERATING MECHANISM FOR DUMP CAR DOOR RAISING AND SUPPORTING SHAFTS
Original Filed Dec. 9, 1922     2 Sheets—Sheet 1
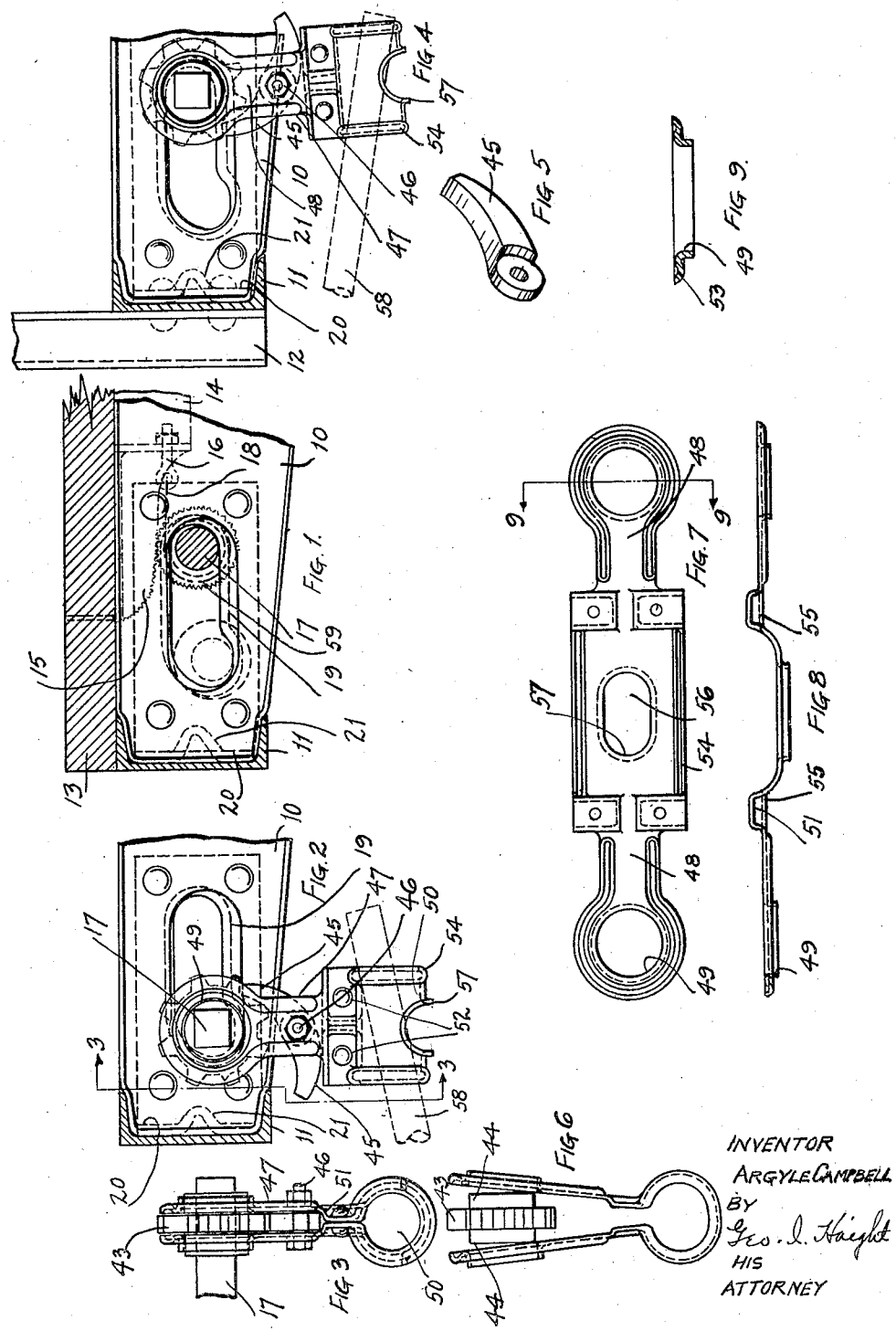
INVENTOR
ARGYLE CAMPBELL
BY
Geo. I. Haight
HIS ATTORNEY

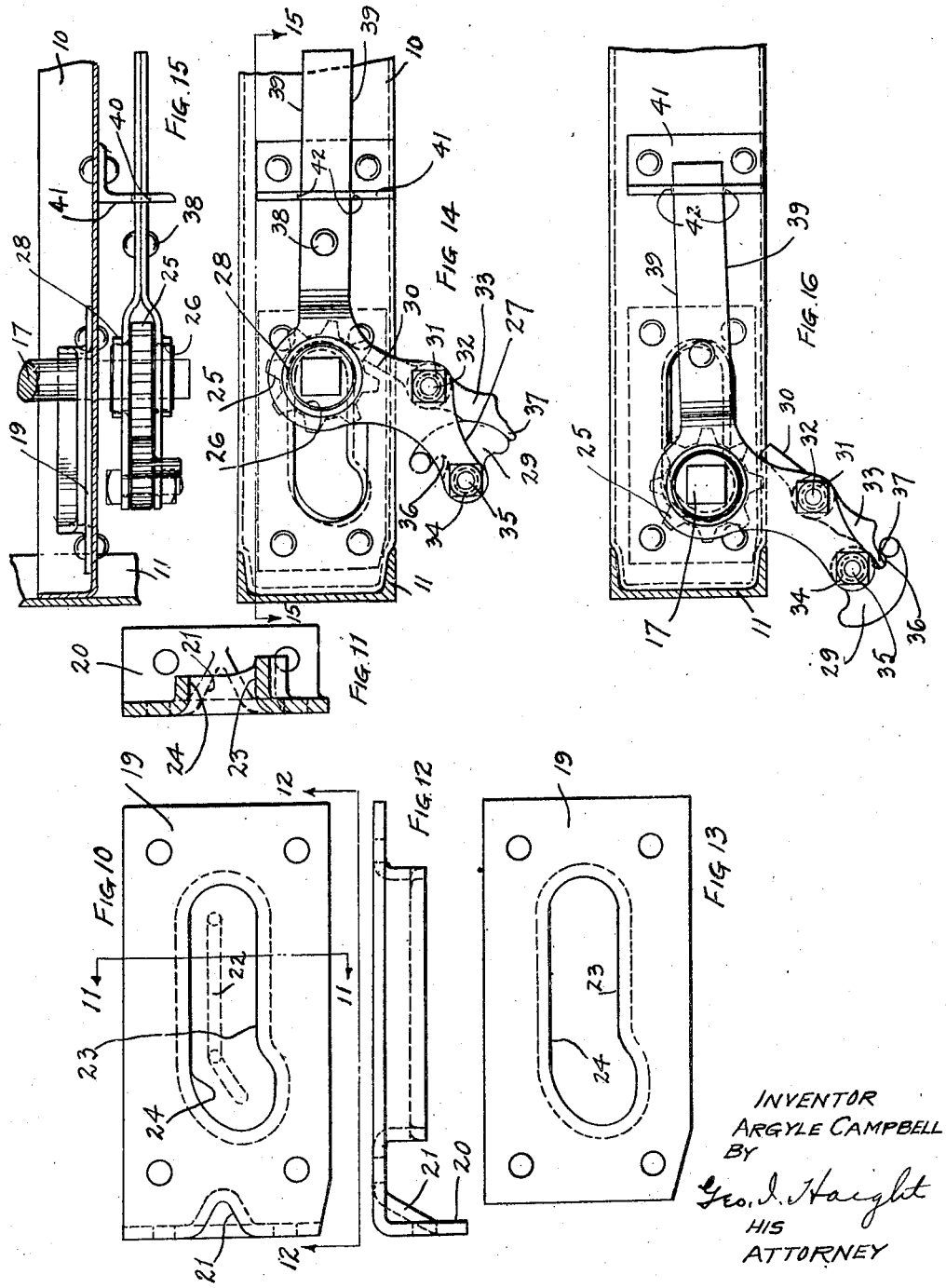

Patented Dec. 30, 1924.

1,520,695

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

OPERATING MECHANISM FOR DUMP-CAR-DOOR RAISING AND SUPPORTING SHAFTS.

Application filed December 9, 1922, Serial No. 605,787. Renewed October 24, 1924.

*To all whom it may concern:*

Be it known that I, ARGYLE CAMPBELL, a citizen of the United States, residing at Chicago, in the county of Cook and State of Illinois, have invented a certain new and useful Improvement in Operating Mechanisms for Dump-Car-Door Raising and Supporting Shafts, of which the following is a full, clear, concise, and exact description, reference being had to the accompanying drawings, forming a part of this specification.

This invention relates to improvements in operating mechanisms for dump car door-raising and supporting shafts and in the supporting means therefor.

The invention deals more particularly with that type of dump car wherein a rotatable shaft is supported in slotted bearings and adapted to move from a position adjacent the free edges of the discharge doors to a position directly under the same.

In cars of the identified type it is customary to form the bearings of cast metal with depressed portions in the outer ends thereof forming seats for the shaft. Flexible elements are connected to the shaft and also to the doors in such manner that rotation of the shaft in one direction in its seats winds the flexible element on the shaft thereby bringing the door to the level of the shaft and thereafter causing a bodily movement of the shaft to a position under the doors. During such winding operation and subsequent translatory movement of the shaft there is a large amount of friction between the shaft and bearings due to the roughness of the cast bearings and it is an object of this invention to ensure a smooth bearing by substitution of pressed steel bearings in place of the rough castings hitherto used and thereby reduce the friction and facilitate the operations.

Furthermore, pressed steel bearings are particularly immune from breakage and this feature together with their low cost of production overcomes disadvantages which are peculiar to bearings of cast metal.

It is also an object of my invention to provide an improvement over existing methods of locking the shaft against reversal due to the weight of the doors and to provide an improved actuating lever mechanism to rotate the door-raising and supporting shaft.

A particular object of this invention is to provide a mechanism for locking and raising the doors wherein the parts subjected to severe strain may be manufactured of forged metal or pressed steel and my invention also resides in the peculiar formation of the parts wherein great strength and rigidity are secured with minimum weight of the parts.

Further, my invention resides in certain novel construction of parts and novel combinations of the parts, as will be more fully pointed out hereinafter.

In the drawings forming a part of this specification, Figure 1 is a sectional view of a portion of a car structure showing the shaft in supporting position under a door. As will be understood by those skilled in the art, I have only illustrated sufficient of the car structure and door operating mechanism to explain the invention. In actual practice, there will ordinarily be a plurality of doors co-operable with a single shaft and preferably two flexible connections or chains and associated elements with each door. Figure 2 is a sectional view of a portion of the car structure with the shaft located in the recessed portion of one of the bearings and showing the actuating mechanism for the shaft in operating position with the pawl in raising position. Figure 3 is a side view of the operating mechanism shown in Figure 2. Figure 4 is a view similar to Figure 2 except that the shaft is in supporting position under the door with the pawl in releasing position. Figure 5 is a perspective view of one of the operating pawls. Figure 6 is a view showing the method of assembling the operating ratchet wheel and lever member. Figure 7 is a plan view of the lever member before the same is bent to the shape shown in Figure 6. Figure 8 is a side view of the lever member as shown in Figure 7. Figure 9 is a sectional view taken on line 9—9 of Figure 7. Figure 10 is an elevational view of the pressed steel bearing for the shaft. Figure 11 is a sectional view of the bearing taken on line 11—11 of Figure 10. Figure 12 is an edge view of the bearing member shown in Figure 10. Figure 13 is a view of a modified form of shaft bearing. Figure 14 is a sectional elevational view of a portion of the car structure showing the creeper mechanism with the shaft in locked position. Figure 15 is a sectional top view taken on line 15—15 of Figure 14. Figure 16 is a sectional elevational view of a portion of the car structure showing the creeper mechanism with the shaft in the door release position and the locking pawl in disengaged position.

In said drawings the invention is applied by way of illustration to a general service type of car including cross bearers 10, side sill 11, side stake 12, and floor 13. One of the dump doors, of which the outer portion only thereof is shown, is indicated in Figure 1 by dotted and full lines and includes a suitable framework 14 to which is secured bracket 15 adapted to receive eyebolt 16 by means of which a suitable connection is made between the shaft 17 and the door by means of flexible element 18. While only one flexible element has been shown, it will be understood that there are preferably two associated with each door.

The door shaft is supported in bearings 19 secured to the crossbearers. Each of the bearings, as shown, is formed by pressing out a metal plate and preferably formed angle shape by bending flange 20 at an angle to the main body of the plate and reinforcing such bend by embossing a corrugation 21 extending at an angle between the flanges. The bearings are pressed from sheet metal and the preferred procedure is to form a slotted perforation in the original blank plate as shown in dotted lines at 22 in Figure 10 and then heating the plate and pressing out the metal adjacent the perforation at right angles to the main body of the plate, thereby producing an elongated slot with a depressed portion at one end and a continuous flange around the edge of the slot. Inasmuch as it is desirable for the shaft to have an extended bearing lengthwise thereof, the slot 22 is so disposed that the lower flange 23 of the bearing will extend beyond the top flange 24 thereby providing for increased bearing surface for the shaft. The end walls of the slot connecting the flanges 23 and 24 are formed arcuate shape and constitute stops to limit the transverse movements of the shaft.

While the preferred construction for general service cars is to attach the bearings to crossbearers disposed adjacent the stakes and secure the flanges 20 to both the side sill and stakes thereby forming a very rigid connection between the side of the car and crossbearers as shown in Figure 4, the bearings may also be constructed without this flange as shown in Figures 13 to 16 and secured to the crossbearers only.

The improved means for securing the shaft against rotation in an unwinding direction consists, broadly, of a locking ratchet wheel 25 rigidly secured to the shaft, preferably by making a portion thereof square. The ratchet is formed with hub portions 26 disposed to either side thereof forming bearings on which creeper arms 27 are mounted. These arms, which are preferably made of forged metal or pressed from metal plates, may be formed of comparatively thin steel and the bearing area of the same with respect to the ratchet wheel increased by pressing out a portion of the main body of the plate forming bearing sleeves 28.

The creeper arms are both extended downwardly and spaced apart to accommodate, in addition to the ratchet wheel, the safety cam 29 and locking pawl 30. The locking pawl 30 is adapted to engage the ratchet wheel 25 and is mounted on a thimble 31 through which the bolt 32 passes and whereby the pawl is pivotally mounted. The pawl 30 is gravity actuated by forming the lower portion thereof 33 heavier than the engaging portion so that the engaging portion 30 will automatically drop into locking position with respect to the ratchet wheel 25. To prevent accidental disengagement of the locking pawl 30, I provide the safety cam 29 likewise pivotally mounted on a thimble 34 through which pivot bolt 35 passes. Figure 14 shows the pawl 30 in locking position with respect to the ratchet wheel 25 and the cam 29 in locking position with respect to the said pawl, the cam being disposed in the path of the weighted portion 33. In order to release the shaft, the cam 29 is swung back and the pawl 30 moved out of the path of the ratchet wheel as shown in Figure 16. The cam 29 is provided with a recessed portion 36 adapted to engage with a lug or tail piece 37 formed on the end of the weighted portion 33 of the pawl 30 for the purpose of maintaining the same in disengaged portion with respect to the ratchet wheel as shown in Figure 16.

The arms of the creeper 27 are offset as shown in Figure 15 and secured together by means of a bolt or rivet 38. In order to secure the creeper against rotation, the edges of the arm 39 are made smooth and extended within a perforation 40 formed in a bracket which may conveniently be formed of an angle 41 as used in this instance. The upper and lower edges 42 of the perforation constitute guides between which the creeper moves during the translatory movement of the shaft. It will be noted that as the shaft moves toward the end of the slot to its locking position, the effective length of the lever arm preventing rotation of the shaft decreases, thus providing a short lever arm while the car is loaded and in transit and thereby enabling the use of a creeper of a very light and cheap construction.

To actuate the shaft 17 a ratchet wheel 43 is employed, formed with hub portions 44 disposed to either side thereof, and co-operable with said ratchet wheel 43 are two curved gravity pawls 45, as shown in Figure 5, which are pivotally mounted on a common pivot bolt 46, as indicated in Figures 2 and 3, carried by a lever member 47. The lever member 47 is preferably formed in one piece and pressed from a metal plate. The lever in its assembled relation on the shaft is provided with web portions 48 extending outwardly from the shaft and disposed to each side of the ratchet wheel 43 and having sleeve portions 49 pressed out of the main body of the plate and fitting over the hubs 44 of the ratchet wheel thereby permitting the lever member to oscillate freely with respect to the ratchet wheel. At its outer end the lever member is formed with an enlarged socket 50 disposed at an angle to the outwardly disposed web portions and within which a bar or suitable tool may be inserted for the purpose of producing leverage and effecting rotation of the lever. In order to effectively space the vertical walls from the side of the ratchet wheel and to ensure the proper space for the effective working of the pawls and prevent binding of the same, the side walls or webs are formed with bends therein at 51 through which bolts or rivets 52 pass which, in co-operation with pivot bolt 46, maintain the two side walls of the lever member in operative relation with the ratchet. The The webs of the lever constituting the side walls thereof are made of sufficient width to provide for stiffness of the lever in its plane of rotation and in order to guard against sidewise bending of the same the edges of the plates are rigidified by distorting the metal preferably with a corrugation 53 extending around the edge of the plate and preferably of a section as shown in the enlarged sectional view in Figure 9. The edges of the plate forming the ends of the sockets are likewise reinforced by distortion of the main body of metal and preferably with a corrugation 54. The socket portion of the lever 50 is braced to the side walls by means of centrally disposed corrugations 55 preferably made of V shape. A centrally disposed elongated perforation 56 is formed in the plate and is stiffened by flanging the edge thereof at 57 substantially at right angles to the main body of the plate. The elongated perforation thus formed in the flat plate provides an extra opening in the socket when the plate has been bent to form the completed lever member as illustrated in Figure 2, thereby permitting the insertion of the bar at various angles.

The manufacture of the lever may conveniently be carried out as follows. The plate is first blanked out with the required perforations formed therein and thereafter bent to the shape indicated in Figures 7 and 8 between dies and the corrugations formed in the same operation. The pressing thus formed is then bent over a mandrel, (or polygonal bar if a socket of polygonal shape is required), to the form indicated in Figure 6 when the ratchet wheel is inserted between the web portions. The webs of the lever are then forced together and maintained in assembled relation with the rachet wheel by means of the rivets 52 and pawl pivot bolt. While I prefer to form the lever in one piece as shown, it is evident that it may also be formed of a plurality of parts suitably united.

The operation of the mechanism takes place as follows: To wind up the doors the operator inserts the end of the bar 58 in the socket 50 and then swings downwardly as viewed in Figure 2. In preparing for this movement, the operator will engage the far pawl 45 with the ratchet 43 by hand and the weight of the bar applied to the socket 50 will be sufficient to keep the pawl in engagement until the operator actually forces the bar downwardly and thereby rotates the ratchet 43 and shaft 17 part of a revolution. The pawl 45 is curved in order that it may project beyond the webs of the lever and be readily grasped by the operator. When the shaft is thus rotated one step, it is evident that the locking pawl 30 of the creeping mechanism will hold the shaft by means of ratchet 25 and catch it in whatever position it may have been adjusted while the operator moves the bar in the opposite direction to engage the next tooth of the operating ratchet 43. In this connection, it will be understood that the locking pawl 30 has its lower end or tail piece 37 disengaged from the recess 36 of the cam block 29 so that said locking pawl 30 will be free to engage the teeth of the ratchet 25 and slip over the latter step by step, during the operation of closing the doors. These operations are repeated until the doors have been moved to a fully closed position and the shaft moved to a supporting position under the same when the operator will throw the cam into locking position as shown in Figure 14. In this particular instance, I have, for the purpose of showing more clearly the various items of detail, illustrated the creeping mechanism and the operating mechanism separate but it will be understood that they are preferably disposed adjacent to each other on the squared end of the shaft. To release the doors, the far pawl 45 is allowed to fall by gravity into disengaged position while the near pawl 45 is moved into engagement with the operating ratchet wheel 43 as shown in Figure 4 and a reversal of the door raising operation is effected.

Fixed to the shaft are rollers 59, corresponding to the number of doors, each formed with a serrated face adapted to engage with a serrated face on a bracket 15 of the door, thereby causing a greater adherence between the doors and the shaft than between the surface of the shaft and the surface of the bearings and, consequently, when the shaft is rotated in a clockwise direction, the shaft has a rolling motion with respect to the doors and a sliding action with respect to the bearings thus causing movement of the shaft to a position adjacent the free edge of the doors and permitting the opening of the same. In order to move the shaft under the doors during the closing operation of the same, the flexible connections 18 provide a positive connection between the shaft and the doors, but during the dumping operation there is no such positive connection and the successful release of the shaft then becomes dependent on a difference of frictional ratios between the shaft and door to cause adherence therebetween as compared with the shaft and bearing. I find that the combination of a shaft 17 made of a rolled section in sliding contact with a bearing 19 formed of pressed metal used in combination with a serrated roller 59 of cast metal in engagement with a serrated bracket 15 also of cast metal is an ideal one, assuring ease and certainty of operation combined with low cost of manufacture and maintenance.

The invention as illustrated herein has been shown as applied to a car of the general service type wherein the shaft extends longitudinally of the car, but it is to be understood that it is also applicable to a car wherein the doors and operating shaft extend transversely of the car. While I have shown and described a single embodiment of my invention, it will be understood that certain changes may be made therein without departing from the spirit of my invention, and all modifications are contemplated which come within the scope of the following claims.

What I claim is:

1. In a dump car, the combination with a discharge door; of a bodily movable shaft adapted to move from a position adjacent the free edge thereof to a supporting position directly under the same: and a bearing for the said shaft, said bearing comprising a plate having a flange pressed out from the main portion of said plate, said flange presenting walls at right angles to the main body of the plate.

2. In a dump car, the combination with a door raising and supporting shaft; of a slotted bearing therefor, said bearing comprising a vertically disposed plate having a flange pressed out from such vertically disposed portion and presenting horizontal upper and lower walls united by end walls of arcuate shape, said lower wall forming the support for the shaft and extending longitudinally thereof outwardly beyond the upper wall.

3. In a dump car, a car underframe including a beam extending transversely of the car; a side wall; and a vertically disposed plate bent to present angularly related walls, one of the said walls being secured to the side structure of the car and the other of said walls being secured to the transversely extending beam, one of the said walls having a slot with the edge thereof pressed outwardly from the said vertically disposed wall and forming a flange extending continuously around the edge of the slot, the lower flange constituting a bearing for a door raising and supporting shaft.

4. In a dump car, a car underframe including a crossbeam; a side sill; and a vertically disposed plate bent to present angularly related walls, one of the said walls being secured to the side sill of the car and the other wall being secured to the crossbeam, a corrugation in the plate and extending at an angle between the said walls, the wall secured to the crossbeam having a slot formed therein and a flange pressed outwardly from the said plate and forming a reinforcement extending continuously around the edge of the slot with the lower flange thereof adapted to form a support for a door raising and supporting shaft.

5. In a dump car, in combination; a discharge door; a rotatable and bodily movable shaft formed of a rolled section and having a roller of cast metal presenting a serrated face rigidly secured thereto, the said shaft being adapted to move from a position adjacent the free edge of the door to a position under the same, the door being provided with a bracket of cast metal presenting a serrated face adapted to be engaged by the aforesaid serrated roller face carried by the shaft; a slotted bearing having a depressed portion at one end constituting a bearing for the shaft; a flexible connection between the shaft and the door, the said shaft being adapted to rotate in the depressed portion of the bearing and wind the flexible connection on the shaft thereby raising the door and thereafter move bodily to a supporting position under the door, the aforesaid bearing consisting of a rolled plate having a flange pressed out from the main portion of the plate and presenting upper and lower flanges disposed substantially at right angles to the main body of the plate.

6. In a dump car, a door supporting shaft adapted to be reciprocated by rotation thereof; a track for said shaft; a ratchet wheel secured to said shaft; a creeper pivotally mounted on said shaft; a pawl pivoted to said creeper and adapted to engage said ratchet; and a bracket mounted adjacent the aforesaid track formed with a perforation within which the creeper is adapted to slide.

7. In a dump car, a door supporting shaft adapted to be reciprocated by rotation thereof; a track for said shaft; a ratchet wheel secured to said shaft; a creeper mounted on said shaft; a weighted pawl pivoted to said creeper and adapted to engage said ratchet wheel; and means independent of the track for engaging the creeper to prevent turning movement thereof.

8. In a dump car, a door supporting shaft adapted to be reciprocated by rotation thereof; a track for said shaft; a ratchet wheel secured to said shaft; a creeper mounted on said shaft; a weighted pawl pivoted to said creeper and adapted to engage said ratchet wheel; a safety cam adapted to engage the weighted portion of said pawl; and means independent of the track for engaging the creeper and prevent turning movement thereof.

9. In a dump car, a door supporting shaft adapted to be reciprocated by rotation thereof; a track for said shaft; a ratchet wheel secured to said shaft; a creeper pivotally mounted on said shaft and having an arm extending outwardly therefrom; a pawl pivoted to said creeper and adapted to engage the ratchet wheel; and means for restraining turning movement of the creeper, said means acting on the exterior of the aforesaid arm at varying distances from the pivotal support thereof.

10. In a dump car, the combination with a dump door; of a door raising and supporting shaft adapted to be reciprocated by rotation thereof and movable to a position under the door; a track for said shaft; a ratchet wheel secured to said shaft; a creeper pivotally mounted on said shaft and having an arm extending outwardly therefrom; a pawl pivoted to said creeper; and means for restraining turning movement of the creeper, the said means acting on the creeper arm, to provide for a long lever arm thereon during the door raising operation and providing for a shorter lever arm when the shaft is in the supporting position under the door.

11. In a dump car, the combination with a discharge door; of a rotatable bodily movable shaft adapted to move from a position adjacent the free edge thereof to a supporting position under the same; a slotted bearing having a depressed portion at one end constituting a bearing for the said shaft; a flexible connection between the shaft and the door, the said shaft being adapted to rotate in the depressed portion of the bearing and wind the flexible element on the shaft to raise the door and thereafter move bodily to a supporting position under the door; a ratchet wheel secured to the shaft; a creeper pivotally mounted on said shaft and having an arm extending therefrom; a pawl pivoted to said creeper and adapted to engage said ratchet; and guides for preventing turning movement of the creeper disposed in the plane of rotation of the said creeper and between which the creeper is adapted to have reciprocatory movement, the said arm being adapted to engage the guides at varying distances from its pivotal support.

12. In a dump car, a door supporting shaft adapted to be reciprocated by rotation thereof; a ratchet wheel secured to said shaft; a creeper movable in unison with said shaft, said creeper including two plate-sections disposed one on each side of said ratchet wheel; a pawl disposed between said plate sections; a pivot extending through said plate sections and pawl; additional securing means for maintaining said plate sections in fixed relation to each other; and means preventing turning movement of the creeper.

13. In a dump car, a door supporting shaft adapted to be reciprocated by rotation thereof; a ratchet wheel secured to the shaft having a hub formed integrally therewith; a non-rotatable creeper movable in unison with the shaft; and a pawl pivoted to said creeper adapted to engage the ratchet wheel and prevent reverse rotation of the shaft, the said creeper including a plate having a transversely widened sleeve portion fitting over the aforesaid hub and formed by pressing out a portion of the plate substantially at right angles to the main body of the plate.

14. In a dump car, in combination: a door supporting shaft adapted to be reciprocated by rotation thereof; a ratchet wheel secured to said shaft; a creeper formed with a pair of plate sections disposed one on each side of the ratchet wheel; a pawl adapted to engage the ratchet wheel and disposed between said plate sections; a pivot extending through said plate sections and pawl and means to prevent turning movement of the creeper.

15. In a dump car, the combination with a dump door; of a rotatable door raising shaft; and means for rotating said shaft to effect movement of the door, said means including a ratchet wheel having hub portions disposed on either side thereof and rigidly mounted on the shaft, a lever member oscillatably mounted with respect to said shaft, said lever being formed of a plate having web portions disposed to each side of the ratchet wheel and having sleeves formed by pressing out a flange from the main body of the plate adapted to fit over the aforesaid hub portions of the ratchet wheel, and pawls pivotally mounted between the said webs and cooperable with the ratchet wheel, the lower portion of the said lever member being bent to form a socket portion to receive an operating tool.

16. In a dumping vehicle having a discharge door pivoted along one of its edges, the combination with a rotatable operating shaft extending parallel to the free edge of the door and adjacent the latter, said shaft being mounted also for bodily movement; of connections between said shaft and door arranged for elevating the latter when the shaft is rotated in a closing direction; and means for holding said shaft against rotation in a reverse direction in any position of the shaft, said means including an element rigid with the shaft, a second element supported by and bodily movable with the shaft and with respect to which the shaft is rotatable, and means for preventing said second named element from rotating with the shaft, said means including a guide arm extending from said second named element.

17. In a dump car, the combination with a dump door; of an operating shaft; a ratchet wheel rigidly fixed to the shaft; a lever formed of a plate and presenting side walls disposed to either side of the said ratchet and oscillatably mounted with respect thereto; pawl mechanism pivotally mounted between the said walls and adapted to engage the ratchet, the aforementioned walls extending outwardly from the pivotal point thereof and presenting a socket portion disposed at an angle to the said walls; means for spacing the walls apart; means for securing the walls together; and corrugations pressed from the body of the plate for the purpose of rigidifying said plate.

18. In a dump car having floor doors, the combination with an operating shaft for operating said doors; of means for imparting rotary motion to the shaft, the said means comprising a lever member oscillatably mounted with respect to said shaft and having webs spaced apart and extending outwardly therefrom and having a socket portion angularly disposed with respect to the webs, a ratchet wheel rigidly fixed to the shaft and disposed between the aforesaid webs, pawl mechanism pivotally mounted between the said webs and cooperable with the ratchet, the said lever being formed of a pressed plate with the webs thereof reinforced against sidewise bending by corrugations pressed out from the main body of the plate.

In witness that I claim the foregoing I have hereunto subscribed my name this 27th day of October, 1922.

ARGYLE CAMPBELL.

Witnesses:
H. M. WEAMER,
FRANCES SAVAGE.